(12) United States Patent
Frey

(10) Patent No.: US 6,968,240 B2
(45) Date of Patent: Nov. 22, 2005

(54) METHOD FOR CONTROLLING PROCESS PARAMETERS TO ACHIEVE CONSTANT PROCESS CONDITIONS

(75) Inventor: Jürgen Frey, Kirchheim/Teck (DE)

(73) Assignee: Priamus System Technologies AG, Schaffhausen (CH)

(*) Notice: Subject to any disclaimer, the term of this patent is extended or adjusted under 35 U.S.C. 154(b) by 0 days.

(21) Appl. No.: 10/471,714
(22) PCT Filed: Mar. 5, 2002
(86) PCT No.: PCT/EP02/02361
§ 371 (c)(1),
(2), (4) Date: Mar. 11, 2004
(87) PCT Pub. No.: WO02/073328
PCT Pub. Date: Sep. 19, 2002

(65) Prior Publication Data
US 2004/0143347 A1 Jul. 22, 2004

(30) Foreign Application Priority Data
Mar. 14, 2001 (DE) .......................... 101 12 125

(51) Int. Cl.⁷ .............................. G05B 13/02
(52) U.S. Cl. .............................. 700/28; 700/30; 700/31; 700/33; 700/37; 700/46; 700/83; 700/173
(58) Field of Search .............................. 700/28, 29, 30, 700/31, 19, 20, 9, 37, 32, 46, 33, 17, 83, 173

(56) References Cited

U.S. PATENT DOCUMENTS

| | | | | |
|---|---|---|---|---|
| 3,628,116 A | * | 12/1971 | Preikschat | 318/590 |
| 4,054,780 A | * | 10/1977 | Bartley et al. | 700/30 |
| 4,169,224 A | * | 9/1979 | Puschner | 219/124.02 |
| 4,922,412 A | * | 5/1990 | Lane et al. | 700/37 |
| 5,678,132 A | * | 10/1997 | Shiba et al. | 399/59 |
| 5,748,467 A | * | 5/1998 | Qin et al. | 700/50 |
| 6,414,594 B1 | * | 7/2002 | Guerlain | 340/506 |

* cited by examiner

Primary Examiner—Ramesh Patel
(74) Attorney, Agent, or Firm—Bachman & LaPointe, P.C.

(57) ABSTRACT

A method for controlling process parameters to achieve constant process conditions, including studying the actual data and reference data independent of time and applying them one on top of the other so that, in the case of optimum match, a 45° straight line is achieved or, in the case of non-match, one tries to achieve a 45° straight line by modifying the process parameters.

1 Claim, 2 Drawing Sheets

METHOD FOR CONTROLLING PROCESS PARAMETERS TO ACHIEVE CONSTANT PROCESS CONDITIONS

BACKGROUND OF THE INVENTION

The invention relates to a method for controlling process parameters in order to obtain constant process conditions.

In conventional control methods aimed at achieving constant process conditions, it is customary for current measurement data to be compared with reference data as a function of time. As the next method step, it is attempted to make the current measurement data correspond to the reference data by controlling the process parameters. This method has the significant drawback that, even when artificial intelligence is used, a high level of process knowledge is required in order to achieve a reliable solution.

It is the object of the present invention to significantly simplify the above method and make it easier for the user to operate the process, so that the method can be carried out even by less well-trained staff.

SUMMARY OF THE INVENTION

The foregoing object is achieved by the fact that the current data and reference data are observed and plotted against one another in a time-independent manner, so that optimum correspondence results in a 45° straight line, or in the case of a lack of correspondence it is attempted to achieve a 45° straight line by changing the parameters.

This completely novel and simplifying approach consists primarily in a time-independent consideration of current data and reference data. If the corresponding data of a certain process parameter are plotted against one another and identical spacing is selected for the X axis and the Y axis, the result, in the event of optimum correspondence, is a 45° straight line. If the current profile of the measured data deviates from the reference profile, this can be clearly recognized from this form of presentation and can be eliminated by control measures without the need for further process knowledge.

In this context, it is irrelevant whether a complete curve or only a partial range is considered. For the user, it is sufficient for this curve profile to be presented, for example, on a display. The user will immediately recognize the deviation and can then initiate a suitable control operation.

The method according to the invention can generally be employed for all processing processors in which constant physical conditions have to be maintained. Purely by way of example, reference is made to the injection molding/die-casting process. In the case of a multiple mold, it is desirable for the filling operation of molten plastic, ceramic or metal to be balanced out. In this case, by way of example, it is possible for the pressure or temperature profile in the runner or in the cavity from the increase to the maximum value to be plotted against one another and compared with one another. In the event of the curve illustrated in X-Y form deviating from the ideal 45° profile, by way of example the process conditions are changed using a fuzzy logic controller or a neural network until the ideal profile is produced. However, this is merely one exemplary embodiment. There are countless further conceivable embodiments which, however, need not be mentioned here.

BRIEF DESCRIPTION OF THE DRAWINGS

Further advantages, features and details of the invention will emerge from the following description of preferred exemplary embodiments and with reference to the drawing, in which.

DETAILED DESCRIPTION

Figure 1B:
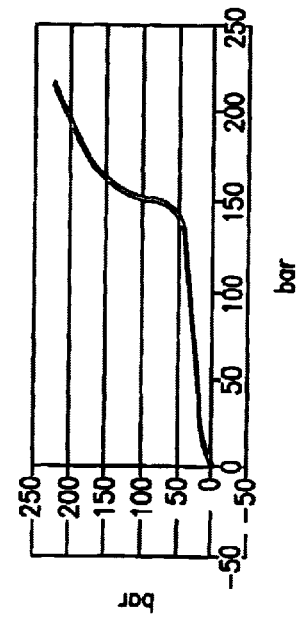
FIGS. 1a and b show diagrams of pressure curves during the operation of filling a cavity of an injection mold.
Figure 1A:
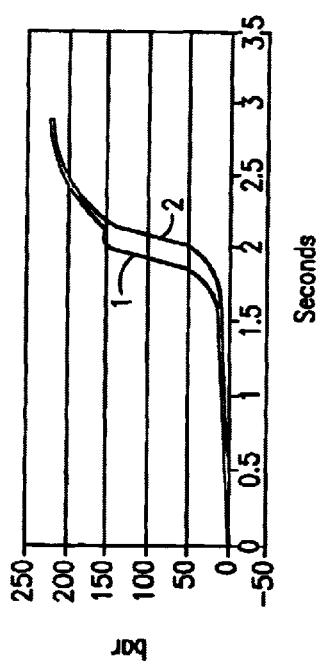

FIG. 1a illustrates the pressure rise during the filling of two cavities in their runner 1 or runner 2. The illustration takes the form of pressure (bar) against time (seconds). It can be seen that the pressure begins after about 1 second and rises considerably after about 2 seconds in the case of runner 2, with the maximum being reached after about 3 seconds. The profile of the pressure rise in runner 2 is taken as the reference pressure curve. Of course, it would also be possible for the profile of the pressure rise in runner 1 to be taken as the reference curve.

The pressure profile in runner 1 deviates from the pressure profile in runner 2 in the range between 1.8 seconds and 2.4 seconds. If the pressure profile in runner 1 is now plotted against the pressure profile in runner 2, as shown in FIG. 1b, the result is a fluctuating curve which deviates from a desired straight line.

Figure 2B:
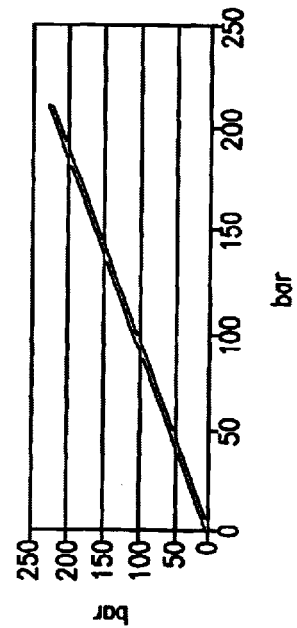
FIGS. 2a and b show diagrams of pressure curves of a further operation of filling a cavity of an injection mold.
Figure 2A:
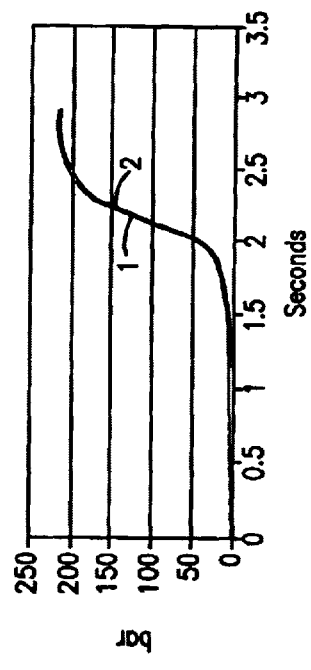

A balanced pressure profile in runners 1 and 2 is desired, as illustrated in FIG. 2a. If the pressure profiles in this case are plotted against one another, as shown in FIG. 2b, the result is a straight line which, if the spacing used on the X axis were to be identical to that used on the Y axis, would represent a 45° straight line.

Figure 3B:
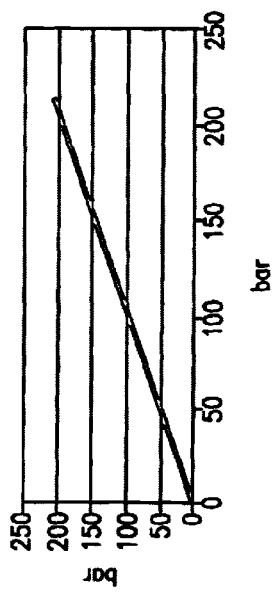
FIGS. 3a and b show diagrams of pressure curves during the solidification phase after the operation of filling a cavity of an injection mold.
Figure 3A:
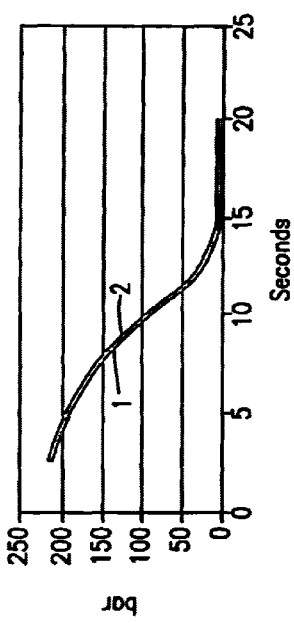

The pressure drop can also be presented in a similar way, in accordance with FIGS. 3a and 3b. FIG. 3a shows that the pressure drop in both runners 1 and 2 coincides, i.e. in this multiple mold it is balanced. In this case too, as shown in FIG. 3b, the result is a straight line, a 45° straight line when an identical spacing is selected for the axes representing the parameters.

Figure 4B:
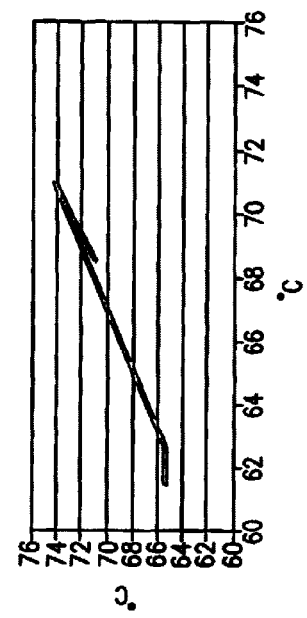
FIGS. 4a and b show diagrams of temperature profiles.
Figure 4A:
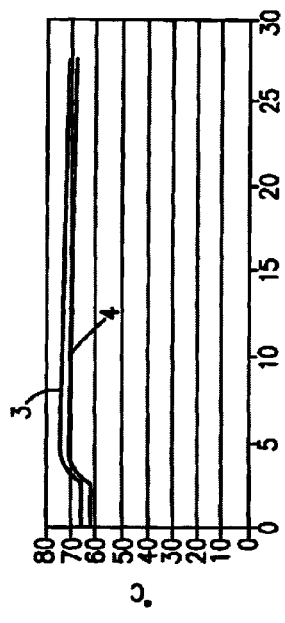

Any desired process parameter can be presented in this inventive way. For example, FIG. 4a plots the current temperature profile as a curve 3 against a reference curve 4. If this temperature profile, as shown in FIG. 4b, is plotted against one another, the deviations are clearly apparent. If it is desired for the current temperature profile to correspond to that of the reference curve 4, this in turn, in the illustration shown in FIG. 4b, results in a straight line, and in the case of identical spacing being used for the two axes, a 45° straight line.

What is claimed is:

1. A method for controlling process parameters to obtain constant process conditions, comprising the steps of:
   obtaining reference data for a process;
   obtaining current data for the process;
   comparing the current data to the reference data and plotting a display to obtain a plotted display;
   determining whether the plotted display corresponds to an optimum display representative of correspondence between the current data and the reference data; and
   correcting a non-corresponding display by controlling process parameters so as to obtain a display which corresponds to the optimum display representation.

* * * * *